(12) United States Patent
Oku et al.

(10) Patent No.: US 6,310,654 B1
(45) Date of Patent: Oct. 30, 2001

(54) DECODER DEVICE AND RECEIVER USING THE SAME

(75) Inventors: Masuo Oku, Kamakura; Hironori Komi; Keisuke Inata, both of Yokohama; Ryosuke Toya, Fujisawa; Kenji Katsumata, Yokohama; Shigeru Komatsu, Yokohama; Shinobu Torikoshi, Yokohama; Takaaki Matono, Yokohama; Fumihito Tanaka, Chigasaki; Masaaki Hisanaga, Yokohama, all of (JP)

(73) Assignees: Hitachi, Ltd., Tokyo; Hitachi ULSI Systems Co., Ltd., Kodaira, both of (JP)

( * ) Notice: Subject to any disclaimer, the term of this patent is extended or adjusted under 35 U.S.C. 154(b) by 0 days.

(21) Appl. No.: 09/241,614

(22) Filed: Feb. 2, 1999

(30) Foreign Application Priority Data

Feb. 4, 1998 (JP) .................................. 10-022916

(51) Int. Cl.[7] ..................................... H04N 3/27
(52) U.S. Cl. ........................ 348/554; 348/569; 348/558; 348/441

(58) Field of Search ..................................... 348/441, 906, 348/569, 554, 558, 553, 564; 345/327, 328; 725/38, 39

(56) References Cited

U.S. PATENT DOCUMENTS

| | | | | |
|---|---|---|---|---|
| 5,903,311 | * | 5/1999 | Ozcelik et al. | 348/403 |
| 5,907,659 | * | 5/1999 | Yamauchi et al. | 386/95 |
| 5,986,711 | * | 11/1999 | Pau | 348/408 |
| 5,991,832 | * | 11/1999 | Sato et al. | 345/327 |
| 6,005,629 | * | 12/1999 | Douche et al. | 348/423 |
| 6,041,161 | * | 3/2000 | Okamoto et al. | 386/112 |

* cited by examiner

Primary Examiner—Victor R. Kostak
(74) Attorney, Agent, or Firm—Antonelli, Terry, Stout & Kraus, LLP (57) ABSTRACT

An object of the present application is to provide the display of motion picture data used in both of analog and digital broadcasts with high picture quality and a common user interface. The above object can be achieved by providing a plurality of picture format converting means, a plurality of OSD means and means for taking motion picture data used in an analog broadcast in a common memory.

3 Claims, 10 Drawing Sheets

DISPLAYED ON MONITOR OF 1920 (H) x 1080 (V) INTERLACE AND 16 : 9

| INPUT PICTURE SIZE | | | | RESIZE COEFFICIENT | | SELECTOR OPERATION MODE | | | |
|---|---|---|---|---|---|---|---|---|---|
| NUMBER OF HORIZONTAL PIXELS | NUMBER OF VERTICAL LINES | SCANNING FORM | ASPECT RATIO | HORIZONTAL PIXEL CONVERSION | VERTICAL SCANNING-LINE CONVERSION | 141 | 142 | 143 | 144 |
| 1920 | 1080 | INTERLACE | 16 : 9 | ×1 | ×1 | C | B | A | B |
| 1920 | 1080 | PROGRESSIVE | 16 : 9 | ×1 | ×1/2 | C | B | A | B |
| 1280 | 720 | PROGRESSIVE | 16 : 9 | ×3/2 | ×3/4 | C | B | A | B |
| 704 | 480 | PROGRESSIVE | 16 : 9 | ×8/3 | ×9/8 | A | B | C | B |
| 704 | 480 | INTERLACE | 16 : 9 | ×8/3 | ×9/4 | A | B | C | B |
| 704 | 480 | PROGRESSIVE | 4 : 3 | ×2 | ×9/8 | A | B | C | B |
| 704 | 480 | INTERLACE | 4 : 3 | ×2 | ×9/4 | A | B | C | B |
| 640 | 480 | PROGRESSIVE | 4 : 3 | ×9/4 | ×9/8 | A | B | C | B |
| 640 | 480 | INTERLACE | 4 : 3 | ×9/4 | ×9/4 | A | B | C | B |

OUTPUT BY VTR (720 (H) × 480 (V) INTERLACE)

| INPUT PICTURE SIZE | | | | RESIZE COEFFICIENT | | SELECTOR OPERATION MODE | | | |
|---|---|---|---|---|---|---|---|---|---|
| NUMBER OF HORIZONTAL PIXELS | NUMBER OF VERTICAL LINES | SCANNING FORM | ASPECT RATIO | HORIZONTAL PIXEL CONVERSION | VERTICAL SCANNING-LINE CONVERSION | 141 | 142 | 143 | 144 |
| 1920 | 1080 | INTERLACE | 16:9 | ×3/8 | ×4/9 | C | A | C | A |
| 1920 | 1080 | PROGRESSIVE | 16:9 | ×3/8 | ×2/9 | C | A | C | A |
| 1280 | 720 | PROGRESSIVE | 16:9 | ×9/16 | ×1/3 | C | A | C | A |
| 704 | 480 | PROGRESSIVE | 16:9 | ×1 | ×1/2 | C | A | C | A |
| 704 | 480 | INTERLACE | 16:9 | ×1 | ×1 | C | A | C | A |
| 704 | 480 | PROGRESSIVE | 4:3 | ×1 | ×1/2 | C | A | C | A |
| 704 | 480 | INTERLACE | 4:3 | ×1 | ×1 | C | A | C | A |
| 640 | 480 | PROGRESSIVE | 4:3 | ×9/8 | ×1/2 | C | A | C | A |
| 640 | 480 | INTERLACE | 4:3 | ×9/8 | ×1 | C | A | C | A |

DECODER DEVICE AND RECEIVER USING THE SAME

BACKGROUND OF THE INVENTION

1. Field of the Invention

The present invention relates to a digital data transmitting/receiving system for transmitting motion image or picture data coded by the International Standard of ISO/IEC, MPEG-2 or the like for coding motion picture data with high efficiency. The present invention also relates to a digital data decoder device for decoding coded motion picture data and outputting it therefrom and a receiver for receiving displayed digital data. Incidentally, a description will be made below of an example in which the present invention is applied to a digital broadcast. However, the present invention is not necessarily limited to this. The present invention can be also applied to an example related to the transmission and reception of data such as data communications or the like in a similar mechanism.

2. Description of the Related Art

Due to an increase in the amount of digital motion image or picture data, high-efficiency coding means performs compression thereon to eliminate redundancy or the like and thereafter transmits or records the coded motion picture data, whereby the cost of transmission or recording can be reduced. As the high-efficiency coding means, there is well known an MPEG-2 system standardized by ISO/IEC/JTC1/SC29/WG11.

As to the coding based on the MPEG-2 system, respective frames of motion picture data are separated into an I frame (Intra Picture) coded without having a frame (reference frame) referred as a predicted value, a P frame (Predictive Picture) with only frames lying in the forward direction in display order as reference frames, and a B frame (Bidirectional Picture) with each frame lying in the forward direction and each frame lying in the backward direction as reference frames. Upon actual coding, two reference frames lying in the forward and backward directions are required to exist upon decoding the B frame, and the data coding is performed after the sequence of frames is skillfully interchanged.

While a decoder device successively decodes coded motion picture data transmitted in coding order, it is necessary to temporarily store the decoded data in a memory and re-arrange or sort the same in accordance with display order. It is also necessary to use decoded data of the I and P frames as reference data upon the subsequent decoding of B frame. The memory is required to certainly store motion picture data corresponding to two frames therein. The re-arrangement or sorting of the data in frame order is performed using each memory corresponding to the two frames. Since the data is coded in one frame unit, the frame data cannot be displayed simultaneously with decoding even in the case of the B frame when one frame is made up of two interlaced fields as in the case of a television signal. It is necessary to convert the frame data to field data sorted in the order of scanning lines. Even for this purpose, a memory corresponding to about one frame is required.

Further, image or picture signals compressed by the MPEG-2 system are classified into several categories. Special emphasis is placed on the two categories called a "main level (ML)" and a "high level (HL)" in particular from an application standpoint.

The main level corresponds to the NTSC system of horizontal 720 pixels x vertical 480 scanning lines x frame frequency of 30 Hz and is adopted for a satellite digital broadcast. The high level corresponds to a high-definition image or picture expressed in horizontal 1920 pixels x vertical 1080 scanning lines x frame frequency of 30 Hz. It has been determined to be adopted for a US ground wave digital broadcast intended to provide high picture-quality broadcasting services. The US ground wave digital broadcast has been introduced in the May 1997 issue, pp47–53 of Nikkei Microdevice, for example.

The capacity of a memory required to decode the coded motion picture data based on the MPEG-2 system is equivalent to one added with that for a coded image or pictorial data buffer for temporarily storing a coded image upon decoding in addition to the capacity corresponding to the three frames. The capacity of the coded image data buffer (VBV) corresponds to 1,835,008 bits in main level and 9,781,248 bits in high level. Even in the case of combinations of coding devices and decoder devices different in manufacturer, this capacitive value is determined by the MPEG-2 system as the required minimum capacity necessary to always maintain the assurance of suitable coding/decoding.

As also introduced in the May 1997 issue, pp47–53 of Nikkei Microdevice, the picture formats of the coded motion picture data range over many divergences. Thus, the display of decoded motion picture data corresponding to these all picture formats on a specific monitor needs to use a display device capable of displaying all these picture formats or utilize a format converting device between a decoder device and a display. The latter is advantageous to reduce the cost of the monitor.

Further, the satellite digital broadcast and the ground wave digital broadcast are not independent services for users who receive these broadcasts and enjoy the same. It is very natural that there is a demand that the users desire to enjoy even the conventional analog broadcast through the same television receiver. It is necessary to meet this demand.

SUMMARY OF THE INVENTION

An example of a device for decoding coded motion picture data, which can be used in a receiver for broadcast service in which picture formats of coded motion picture data have a variety of picture sizes as in the US ground wave digital broadcast, has been disclosed in Japanese Patent Application Laid-Open No. Hei 8-205161. This example is a proposal wherein a high-definition motion picture (HD:High Definition) is decoded while being downsampled to a standard motion picture (SD: Standard Definition) corresponding to the same format as the analog broadcast, thereby facilitating provisions to a plurality of picture formats.

However, the present example has a problem in that the high-definition picture data is merely outputted as the standard picture data and hence the users cannot enjoy a precious high picture-quality broadcast. Further, the example also contains no mentions of a configuration capable of receiving the analog broadcast simultaneously.

An object of the present invention is to solve the above problems, facilitate provisions to broadcasted variety of picture formats and realize simultaneous reception of an analog broadcast.

According to one aspect of the invention, for achieving the above object, the present invention comprises means for decoding motion picture data used in a digital broadcast, memory means for storing the decoded motion picture data therein, first on-screen data multiplexing means for mixing the decoded motion picture data with first on-screen data, first picture format converting means for converting the first on-screen data-mixed motion picture data into format form, and second on-screen data multiplexing means for mixing the format-converted motion picture data with second graphics data, whereby the second on-screen data-mixed motion picture data is outputted. Thus, the motion picture data used in the digital broadcast can be outputted in an arbitrary picture format so that a high picture-quality display can be done. The on-screen data allows the high picture-quality display too. Further, the present invention includes second picture format converting means. The output of second format-converted motion picture data as an output for a recording device from the second picture format converting means makes it possible to use the conventional analog broadcasting recording device.

Further, the present invention includes picture data capturing means for inputting motion picture data used in an analog broadcast therein, and motion picture data memory storing means for allowing the memory means to store the motion picture data used in the analog broadcast. By applying the first picture format converting means even to the motion picture data used in the analog broadcast, the motion picture data can be outputted or displayed without drawing a distinction between the analog broadcast and the digital broadcast.

According to the present invention, as has been described above, high-definition motion picture data can be displayed while remaining high in image quality as the high-definition motion picture data. Further, even if the data is broadcasted in the form of a plurality of image or picture formats, their display picture formats are converted to the same. It is therefore possible to achieve a reduction in the cost of a monitoring device. Since standard motion picture data can be outputted simultaneously with the display motion picture data in addition to the display motion picture data, the conventional analog broadcasting recording device can be also utilized. Further, since the conventional analog broadcast can be also converted to a high-definition motion picture format and displayed in this form, even the conventional analog broadcast can be displayed with high picture quality, described specifically, an easy-to-see screen from which scanning line interference like line flicker (corresponding to such a phenomenon that fine points are flickering) can be provided. Moreover, since data can be displayed in picture-in-picture form or graphics data can be on-screen displayed, a table for an electronic program guide can be displayed. According to the electronic program guide, a cursor of a remote controller is set to or aligned with a program to thereby make it possible to choose a channel and make a recording reservation. The provision of two-system OSDs allows graphics to be displayed on TV but unrecorded on VTR as well as superimposition of graphics on both the TV display and VTR recording, thus making it possible to implement an easy-to-understand user interface.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Preferred embodiments of the present invention will hereinafter be described with reference to the accompanying drawings.

Figure 1:
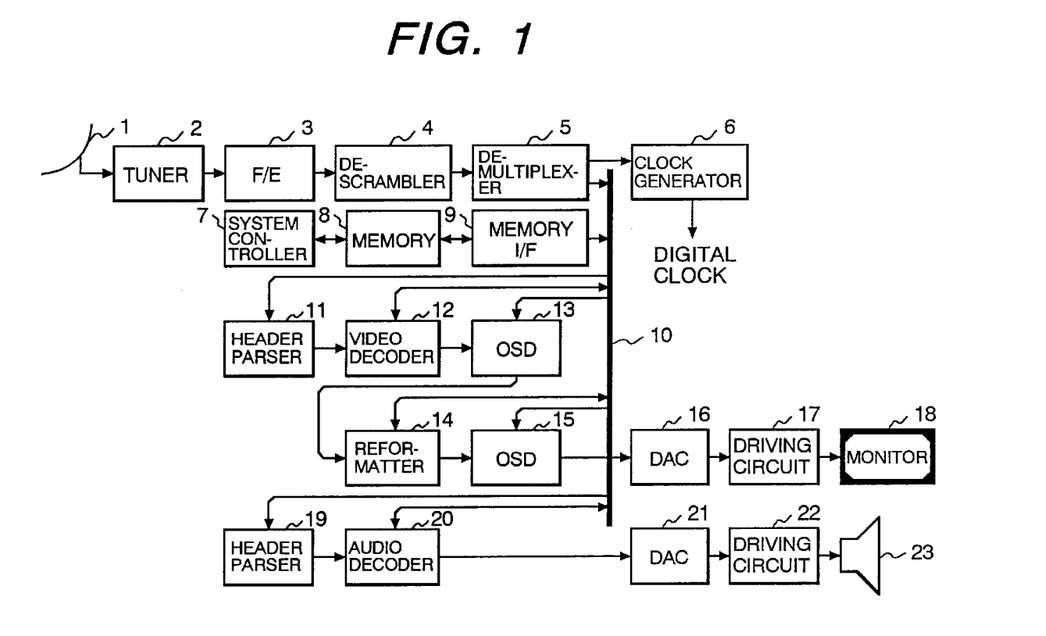
FIG. 1 shows a first embodiment of the present invention and is a block diagram illustrating the present invention applied to a digital broadcasting receiver.

FIG. 1 shows a first embodiment of the present invention and is a block diagram illustrating the present invention applied to a digital broadcasting receiver. In FIG. 1, reference numerals 1, 2, 3, 4, 5, 6, 7, 8, 9, 10, 11, 12, 13, 14, 15, 16, 17, 18, 19, 20, 21, 22 and 23 indicate a digital broadcasting antenna, a digital broadcasting tuner, a front/end circuit, a descrambler, a transport demultiplexer, a clock generator, a system controller, a memory, a memory interface, a memory bus, a video header parser, a video decoder, a first on-screen display circuit (hereinafter described as "OSD circuit"), a reformatter, a second OSD circuit, a first digital-analog converter (hereinafter described as "DAC"), a monitor driving circuit, a monitor, an audio header parser, an audio decoder, a second DAC, a speaker driving circuit, and a speaker, respectively.

A broadcasting wave is received by the digital broadcasting antenna 1 and thereafter converted into frequency form by the digital broadcasting tuner 2. The front/end circuit 3 demodulates a 8-PSK-modulated received signal, for example and corrects its transmission error using error correction parity so as to output a transport stream. With respect to the transport stream, principal digital data thereof is scrambled in a pay broadcast. The scrambled data is descrambled by the descrambler 4 with key information outputted from the system controller 7 as an auxiliary input (where detailed connections around the system controller 7 are omitted because the drawing is put out of order). Further, several programs having different contents are generally contained in the transport stream in multiplexed form. The transport demultiplexer 5 receives instructions for each desired user's program through the system controller 7 to separate one program from the plurality of programs and further separate it into coded video data and coded audio data constituting coded motion image or picture data. The separated respective code data are temporarily stored in a dedicated area of the memory 8 through the memory bus 10 and the memory interface 9. Further, the transport demultiplexer 5 simultaneously separates the multiplexed key information, program multiplex table information representing how to multiplex the respective programs, etc. other than the motion picture data from the input formation or stream and transmits the separated information to the system controller 7. Their transmission is performed before the separation and selection of one program.

Moreover, the transport multiplexer 5 extracts time information from the transport stream and sends it to the clock generator 6. The clock generator 6 controls an internal timer so that the time of a decoder device is set identical to that on the transmitting side, and generates a clock signal used within the decoder device in synchronism with information from the corresponding timer. In the drawing, lines for distributing the clock signal are omitted to avoid the cumbersomeness of their description.

The coded video data stored in the memory 8 is read from the memory 8. The video header parser 11 obtains format information such as an image or pictorial size or the like as header information from the read data and transmits the format information to the video decoder 12 and the system controller 7. Further, the video header parser 11 extracts title data about a closed caption or the like, for example related to the contents of the coded video data and sends it to the system controller 7. While the video decoder 12 decodes the coded video data in accordance with the extracted image or picture format information, it writes the decoded image or pictorial data into a predetermined frame memory area of the memory 8 through the memory bus 10 and the memory interface 9 in its decoding process. As described above, the frame memory area corresponds to three frames, and I and P pictures are read as image-or pictorial data in a reference frame upon decoding P and B pictures. These decode operations are normally produced as pictorial data in a frame comprised of a combination of two fields, whereas the video decoder 12 reads and outputs the pictorial data from the frame memory area of the memory in order of scanning lines every fields per display frames while being re-arranged or sorted in order of the display frames.

The first OSD circuit 13 mixes on-screen data into the output pictorial data of the video decoder 12. The mixed on-screen data corresponds to data processed for display from the above-described title data about the closed caption by the system controller 7. The data processed for display is stored in the memory 8 before it is sent to the first OSD circuit 13 in advance. Each time the first OSD circuit 13 requires data in accordance with the output pictorial data, the processed data is supplied via the memory interface 9 and the memory bus 10 to the first OSD circuit 13 where the output pictorial data and the on-screen data are mixed together in synchronism with each other. Further, the mixed pictorial data is supplied to the reformatter 14.

Figure 2:
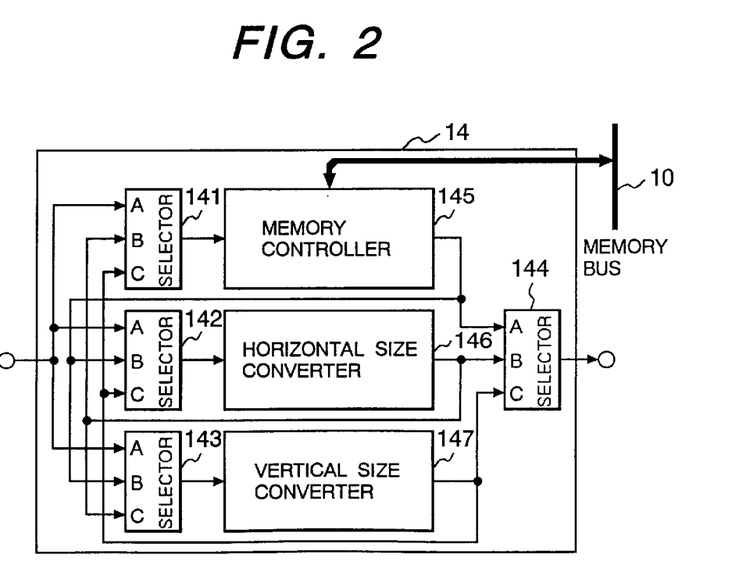
FIG. 2 is a block diagram depicting a reformatter for converting an-image format into reformatted form.

FIG. 2 is a block diagram of the reformatter 14 for converting an image or picture format into reformatted form.

In FIG. 2, reference numerals 141, 142, 143 and 144 indicate selectors which select and output any of three inputs A, B and C, respectively. Reference numeral 145 indicates a memory controller, reference numeral 146 indicates-a horizontal size converter, and reference numeral 147 indicates a vertical size converter, respectively. The selectors designated at reference numerals 141 through 144 control the selection of any input of A, B and C by the system controller 7 according to the ratio between an image size of the coded video data and an image size displayed on the monitor 18 to be described later.

Figure 3:
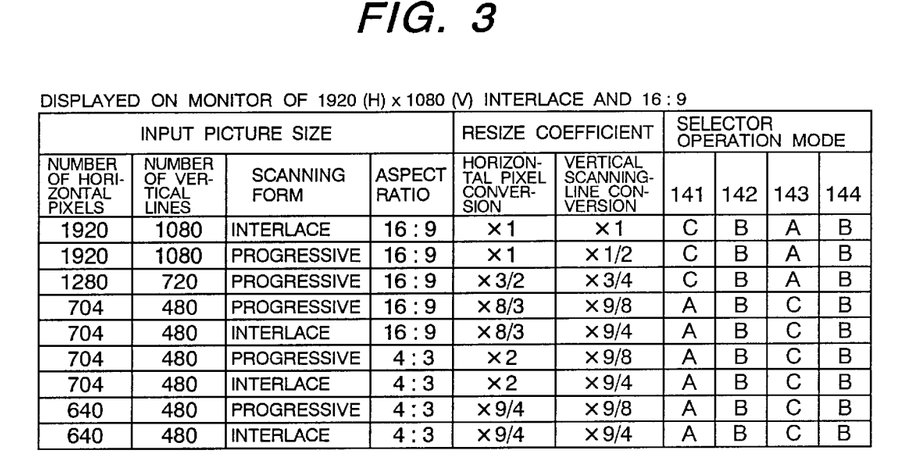
FIG. 3 is a diagram for describing operation modes of the reformatter employed in the first embodiment.

FIG. 3 is a diagram for describing operation modes of the reformatter 14. Horizontal 1920 pixels (effective component), vertical 1080 lines (effective component), a frame frequency 30 Hz, 2:1 interlace scanning and a screen aspect ratio 16:9, which are well known as a high-definition image (HDTV), are assumed as a scanning format of image data displayed on the monitor 18. Size conversion coefficients of the horizontal size converter 146 and the vertical size converter 147 and which input would be selected by the four selectors, are shown in the drawing. When, for example, an image size inputted to the reformatter 14, corresponding to the output of the first OSD circuit 13 has a progressive format expressed in horizontal 1280 pixels x vertical 720 scanning lines at the third stage from above in FIG. 3, the screen aspect ratio of 16:9 and a frame frequency of 60 Hz, the number of pixels is converted from 1280 pixels to 1920 pixels with a horizontal size conversion ratio as (3/2) times, and the number of scanning lines is converted from 720 scanning lines to 1080/2 scanning lines with a vertical size conversion ratio as (3/4) times. In order to convert progressive to interlace, frames of 60 Hz are caused to correspond to fields respectively and thereby the phases of scanning lines in two fields are made different from each other.

The reformatter 14 has a memory controller 145 and utilizes the memory 8 through the memory bus 10 or the like to output the format-converted pictorial data at a predetermined data rate. The selectors 141 through 144 are provided so as to minimize the usage capacity of the memory 8 and a data band width of the memory bus 10. That is, when the conversion ratios of the horizontal size converter 146 and the vertical size converter 147 are smaller than 1, the selectors 141 through 144 are controlled so that the horizontal size converter 146 and the vertical size converter 147 are placed before the memory controller 145, whereas when they are greater than 1, the selectors 141 through 144 are controlled so that they are placed after the memory controller 145.

Since the vertical size conversion coefficient is smaller than 1 in the above-described embodiment, the selector 143 selects A and inputs input pictorial data to the vertical size converter 147. The selector 141 selects C so that the output of the vertical size converter 147 is set as an input to the memory controller 145, after which it is written into the memory 8. Thereafter, the pictorial data is read along a predetermined rate from the memory 8. While the pictorial data read from the memory 8 is outputted from the memory controller 145, it is set as an input to the horizontal size converter 146 by allowing the selector 142 to select B. The reason why the horizontal size converter 146 is placed after the memory controller, is that the size conversion ratio is larger than 1. If both the size conversion ratios are greater than 1, then the vertical size converter 147 and the horizontal size converter 146 are both placed after the memory controller 145. However, the vertical size converter 147 is placed in front of the horizontal size converter 146. This is because this placement is effective in reducing the size of a line buffer (not shown) provided in the vertical size converter 147. When both the size conversion ratios are smaller than 1 and both the vertical size converter 147 and the horizontal size converter 146 are placed before the memory controller 145 due to the similar reason, the horizontal size converter 146 is provided so as to precede the vertical size converter 147. Returning to the illustrated case, the selector 144 finally selects the output (B) of the horizontal size converter 146 and sets it as the output of the reformatter 14.

Referring back to FIG. 1, a further description will be made continuously. The output of the reformatter 14 is inputted to the second OSD circuit 15. The second OSD circuit 15 mixes graphics data such as a program guide or the like into the input pictorial data. The output of the second OSD circuit 15, which has been mixed with the graphics data, is converted to an analog signal by the first DAC 16, followed by display on the screen of the monitor 18 through the monitor driving circuit 17.

The graphics data mixed by the second OSD circuit 15 is produced by the system controller 7 and is stored in the memory 8 in advance, from which the second OSD circuit 15 reads it based on instructions given from the system controller 7. With respect to the contents of a program guide, for example, the demultiplexer 5 font-converts character codes into graphics data along the program multiplex table information separated from the transport stream, after which it is produced by being mixed with background graphics. The graphics data mixed by the second OSD circuit 15 is based upon the image or picture format of the output of the reformatter 14 but is not based on the picture format of the coded video data decoded by the video decoder 12. Therefore, the graphics data such as the characters or the like is thereafter displayed on the monitor 18 without being subjected to significant processing. The graphics data excellent in image or picture quality can be displayed thereon. The program guide is used when a user selects a program. The ability to display the character graphics data high in picture quality leads to high quality of a user interface.

The coded audio data is read from the memory 8 by the audio header parser 19. The audio header parser 19 specifies a coding system and detects synchronous information from the coded audio data to thereby extract audio parameters such as a sampling frequency, etc. and notifies the same to the audio decoder 20. The audio decoder 20 decodes the coded audio data using these audio parameters to thereby obtain audio data. The decoded audio data is converted to an analog audio signal by the second DAC 21, after which the analog audio signal is outputted from the speaker 23 through the speaker driving circuit 22.

According to the embodiment as described above, the suitable setting of the operation of the reformatter 14 based on the picture format of the coded video data allows the conversion of a plurality of image or picture formats to one picture format and display thereof on the monitor 18. This can simplify a scan deflection circuit (not shown) of the monitor 18 and is useful for a reduction in the cost of the entire receiver. When the decoder device (corresponding to the antenna 1 to the first and second DACs 16 and 21) for the coded motion picture data, and the monitor driving circuit 17, the monitor 18, and the speaker driving circuit 22 and the speaker 23 are provided as separate devices, the conventional analog broadcasting receiver can be also used as a monitor device by setting the output of the decoder device for the coded motion picture data to the same picture format as that for the present-existing analog broadcast.

In the present embodiment as well, the two OSD circuits (13 and 15) are provided. Thus, program inherent information suitable for displaying the broadcasted coded video data in the form of the picture format and on-screen display information for improving the user interface can be multiplexed into separately-decoded image data. This is also useful in displaying the data on the monitor 18 in one picture format.

A second embodiment of the present invention will next be described with reference to FIG. 4. However, components shown in FIG. 4 identified by the same reference numerals as those in FIG. 1 have already been described and only the difference between FIG. 4 and FIG. 1 will therefore be explained.

Figure 4:
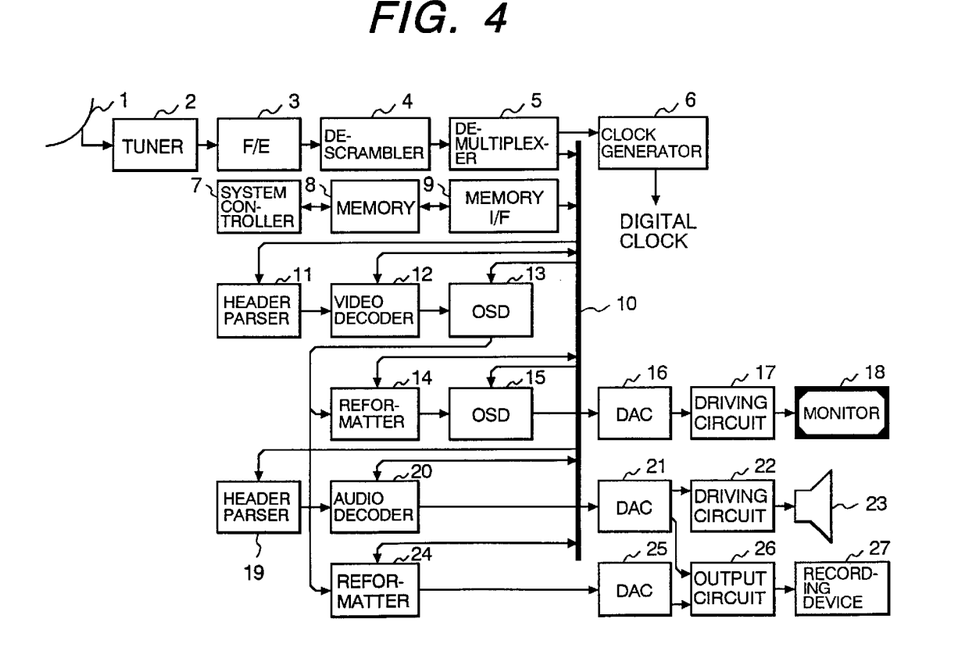
FIG. 4 shows a second embodiment of the present invention and is a block diagram showing the present invention applied to a digital broadcasting receiver.

In FIG. 4, a second reformatter 24, a third DAC 25, a recording-output circuit 26 and a recording device 27 are added to the first embodiment shown in FIG. 1.

Figure 12:
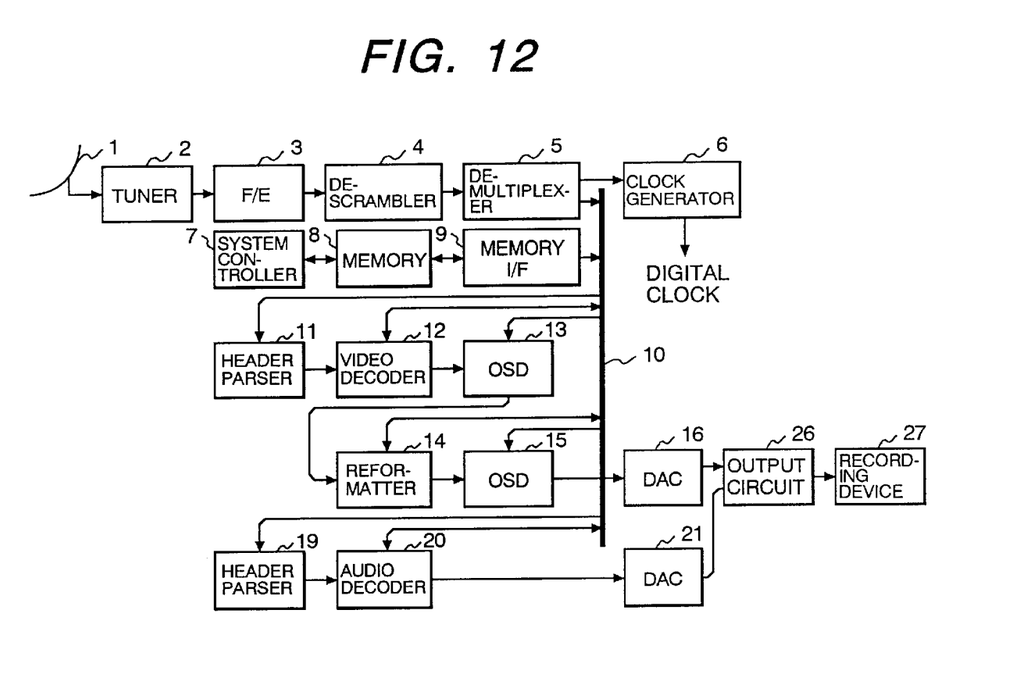
FIG. 12 illustrates a modification of the first embodiment of the present invention and is a block diagram illustrating the present invention applied to a digital broadcasting receiver.
Figure 13:
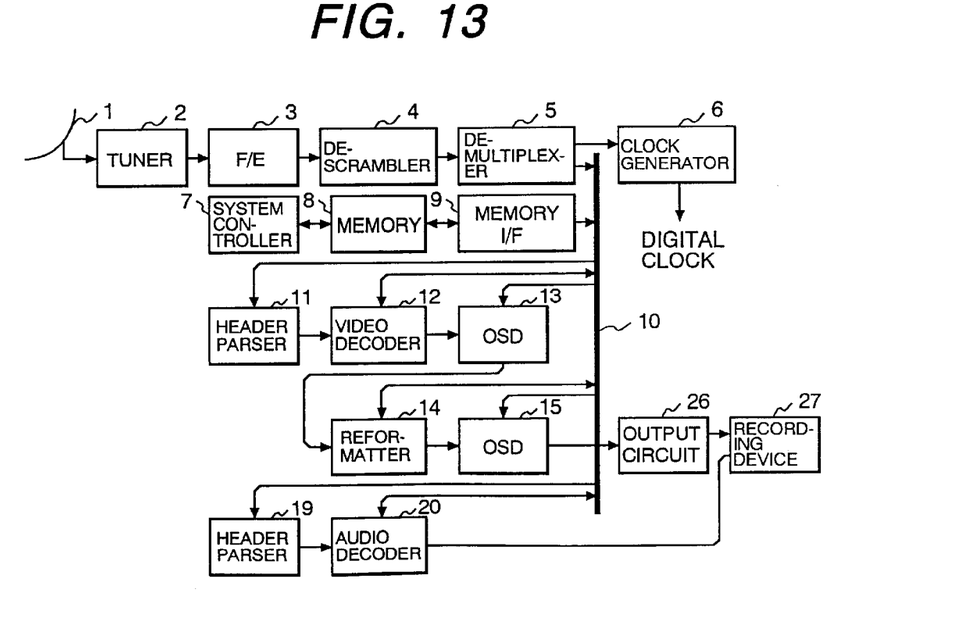
FIG. 13 depicts another modification of the first embodiment of the present invention and is a block diagram illustrating the present invention applied to a digital broadcasting receiver.

The output pictorial data of the first OSD circuit 13 is supplied even to the second reformatter 24 as well as to the reformatter 14 (hereinafter described as a first reformatter). The second reformatter 24 is also identical to the first reformatter described using FIG. 2 in configuration. The second reformatter converts a picture format of the output thereof to the same SDTV as an analog broadcast regardless of the picture format of the coded video data and outputs it to a recording medium such as a video tape through the DAC. Alternatively, the second reformatter converts the picture format of the output thereof to the same HDTV as a digital broadcast regardless of the picture format of the coded video data and outputs it to a recording medium such as a DVD, a D-VHS or the like without having to use the DAC. The present embodiment takes a configuration in which a monitor 18 and the recording device 27 are both provided in FIG. 4. However, the present embodiment may take a configuration of a built-in VTR in which the driving circuit 17 and the monitor 18 shown in FIG. 1 are replaced by the output circuit 26 and the recording device 27. Alternatively, the present embodiment may take a configuration of a built-in DVD in which the DAC 16, driving circuit 17 and monitor 18 shown in FIG. 1 are replaced with the output circuit 26 and the recording device 27. These drawings are shown in FIGS. 12 and 13 respectively. While the reformatters are shown in separate block diagrams as illustrated in the respective drawings, the first and second reformatters may be commonly used as one reformatter.

Figure 5:
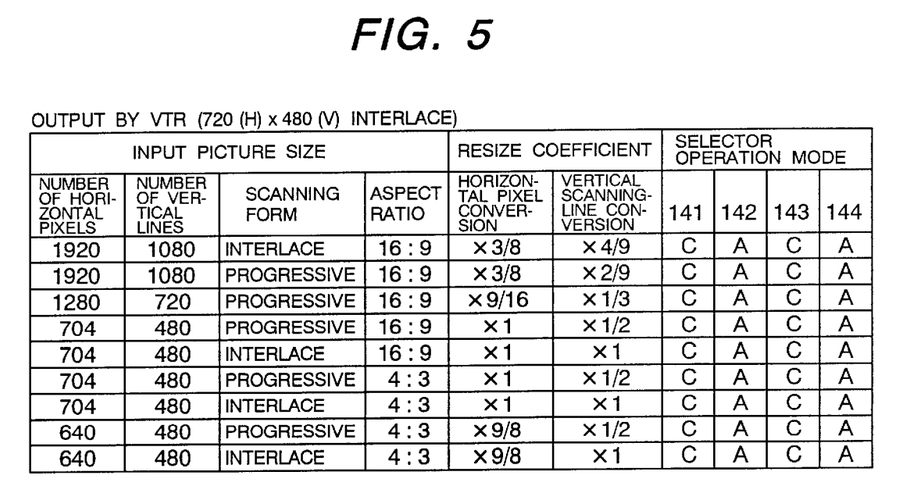
FIG. 5 is a diagram for explaining operation modes of a reformatter employed in the second embodiment.

FIG. 5 is a diagram showing size conversion ratios used to obtain an SDTV output by the second reformatter 24 and settings of selectors 141 through 144 with respect to various input image or picture formats. Further, the output of the second reformatter 24 is used to perform recording to the recording device 27 through the third DAC 25 and the recording output circuit 26. Incidentally, the recording device 27 may be constructed as the same device as the decoder device and receiver according to the present invention. It is however needless to say that it may be provided as a separate device.

The present embodiment is characterized in that the second reformatter 24 is provided to obtain recording image data with a view toward recording it on a recording medium such as a video tape, a DVD, a D-VHS. Particularly when the output picture format of the second reformatter 24 is set to SDTV, an inexpensive VTR like the already widely-available VHS system can be used. On the other hand, when the output picture format is set to HDTV, the DVD and D-VHS considered to be widely available from now on can be used.

A third embodiment of the present invention will next be described with reference to FIG. 6. Even in the description of the present embodiment, the description of certain elements common to those shown in the already-described embodiments will be omitted.

Figure 6:
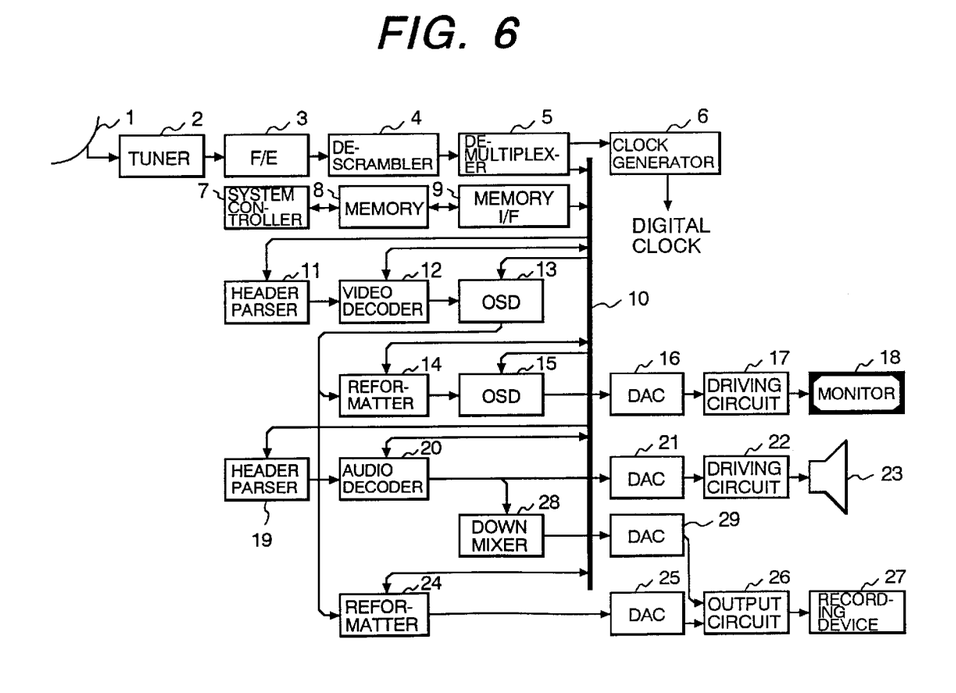
FIG. 6 shows a third embodiment of the present invention and is a block diagram illustrating the present invention applied to a digital broadcasting receiver.

In FIG. 6, a down mixer 28 and a fourth DAC 29 are added to the second embodiment shown in FIG. 4. The down mixer 28 is used to down-mix 2CH or monophonic audio data with, for example, 3/2-mode multichannel audio data decoded by an audio decoder 20. The audio header parser 19 extracts the most suitable downmixed parameters from coded audio data and performs downmixing in accordance with the same. The downmixed audio data is transmitted to the recording output circuit 26 through the fourth DAC 29 and recorded by a recording device 27 together with a video signal.

In the present embodiment, the downmixed parameters instructed on the broadcasting station side can be reflected faithfully so that high sound-quality recording can be done.

As a modification of the present embodiment, the downmixed audio signal corresponding to each of the outputs of the down mixer 28 and the fourth DAC 29 may be constructed so as to be supplied to the speaker driving circuits 22 shown in FIGS. 1 and 6. Since, in this case, the second DAC 21 is unnecessary and the speakers 23 can be also reduced in number as compared with the number of speakers corresponding to respective multichannels, this leads to a reduction in the cost of the receiver.

A fourth embodiment of the present invention will next be described with reference to FIG. 7. In a manner similar to the description made up to now, the description of the already-described elements will be omitted.

Figure 7:
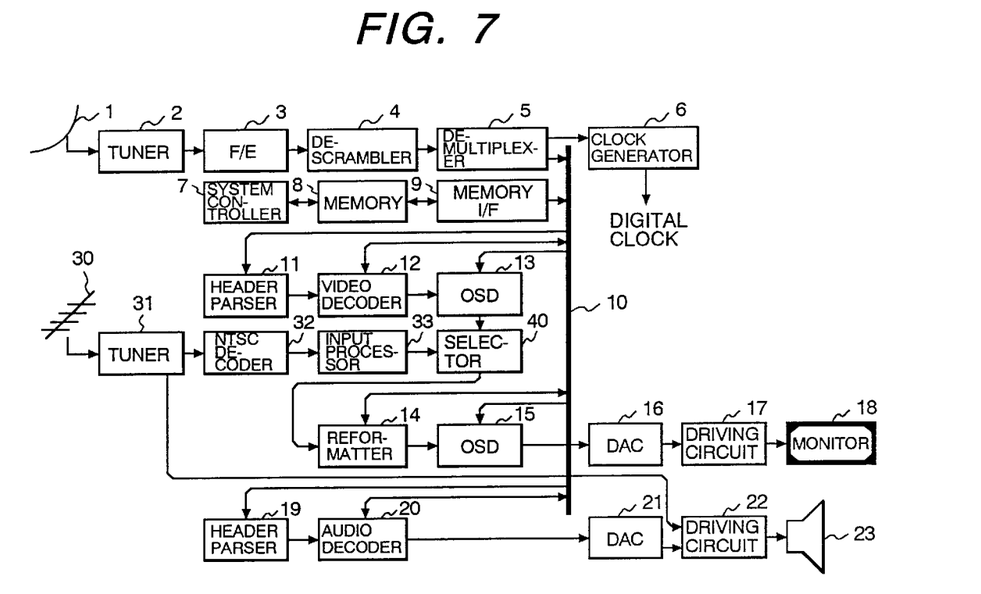
FIG. 7 shows a fourth embodiment of the present invention and is a block diagram illustrating the present invention applied to a digital broadcasting receiver.
Figure 14:
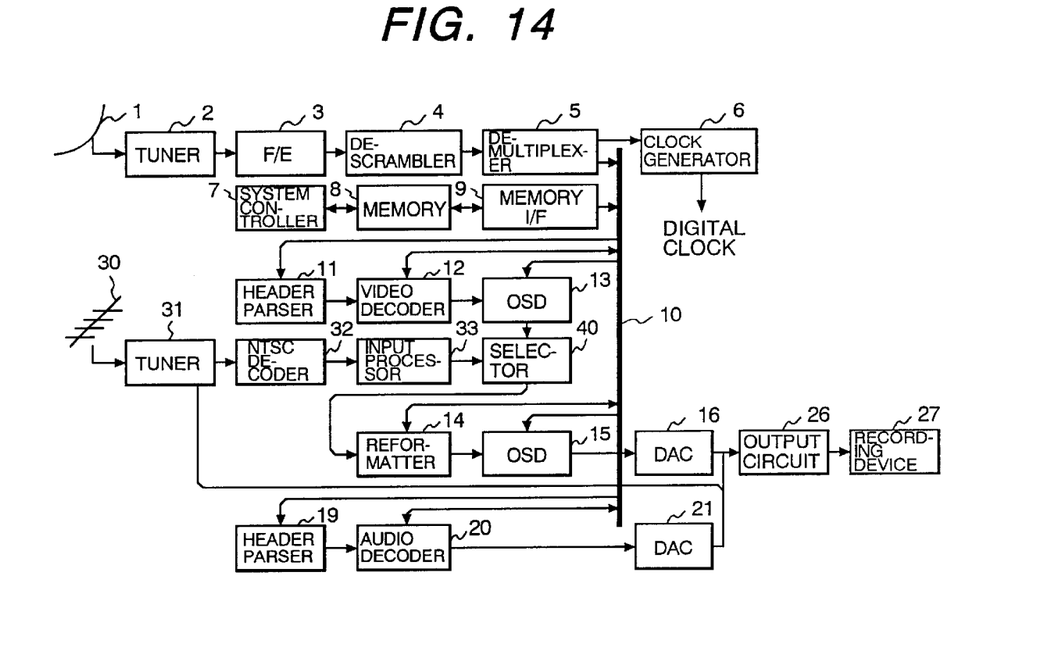
FIG. 14 shows a modification of the fourth embodiment of the present invention and is a block diagram illustrating the present invention applied to a digital broadcasting receiver.
Figure 15:
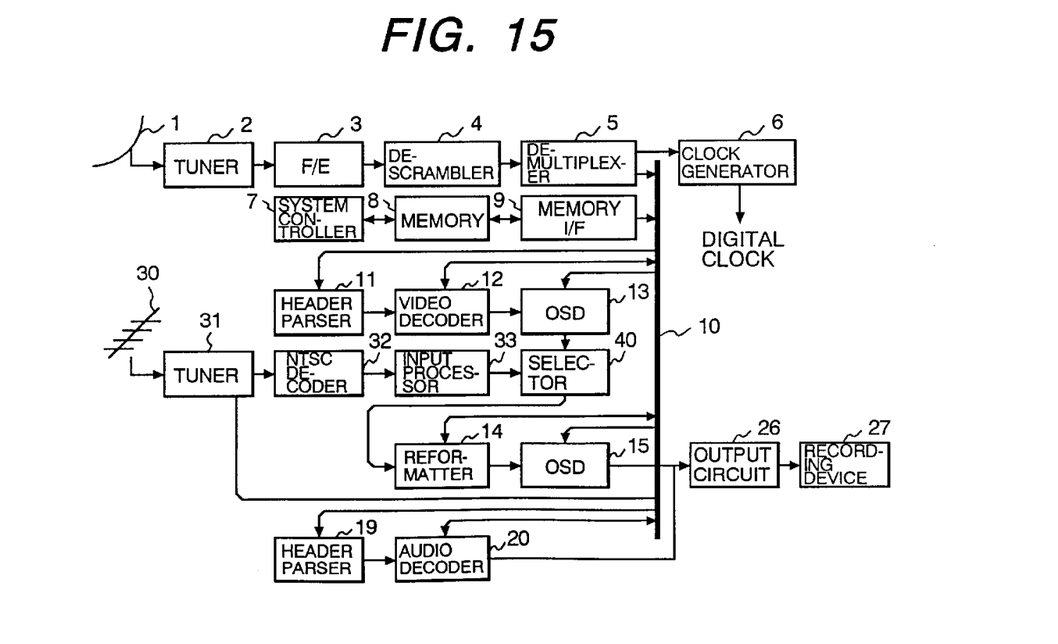
FIG. 15 illustrates another modification of the fourth embodiment of the present invention and is a block diagram illustrating the present invention applied to a digital broadcasting receiver.

In FIG. 7, reference numerals 30, 31, 32, 33 and 40 indicate an analog broadcasting antenna, an analog broadcasting tuner, an NTSC decoder, an input processor and a selector, respectively. The analog broadcasting antenna 30 and the analog broadcasting tuner 31 are ones used to receive the conventional analog broadcast. When a user selects the display of a video signal corresponding to the received analog broadcast on a monitor 18, a system controller 7 is informed of it through the proper user interface (e.g., an unillustrated remote controller) and transfers it to required blocks. In the present mode, the analog broadcast signal received by the analog broadcasting antenna 30 and frequency-converted by the analog broadcasting tuner 31 is converted to component signals (separated into luminance and color-difference signals) by the NTSC decoder 32. The component signals passes through a memory bus 10 and a memory interface 9 via the input processor 33, selector 40 and reformatter 14 so as to be stored in a memory 8. Incidentally, as described in FIG. 4, a built-in VTR may be configured in which the driving circuit 17 and the monitor 18 shown in FIG. 7 are replaced with the output circuit 26 and the recording device 27. Alternatively, an built-in DVD may be constructed in which the DAC 16, driving circuit 17 and monitor 18 shown in FIG. 7 are replaced by the output circuit 26 and the recording device 27. These drawings are illustrated in FIGS. 14 and 15.

Figure 8:
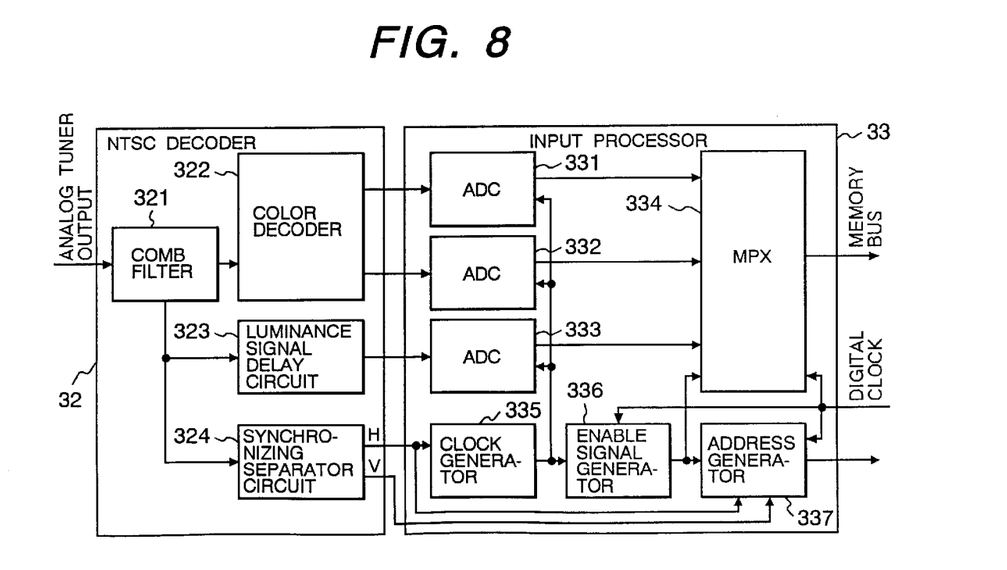
FIG. 8 is a block diagram illustrating an NTSC decoder and an input processor.

FIG. 8 is a block diagram showing the NTSC decoder 32 and the input processor 33. In FIG. 8, reference numeral 321 indicates a comb filter, reference numeral 322 indicates a color decoder, reference numeral 323 indicates a luminance signal delay circuit, reference numeral 324 indicates a synchronizing separator circuit, reference numerals 331, 332, 333 indicate first to third analog-digital converters (hereinafter described as "ADC"), reference numeral 334 indicates a multiplexer, reference numeral 335 indicates an analog clock generator, reference numeral 336 indicates an enable signal generator, and reference numeral 337 indicates an address generator, respectively.

An analog video signal inputted from the analog broadcasting tuner 31 corresponds to a composite signal obtained by combining the luminance signal and the two color-difference signals together in multiplex form as is generally known. As the form of the composite signal, there are known the NTSC system used in Japan and North America, the PAL system used in Europe (except for France) and the SECAM system used in France and Russia. While the NTSC system has been described in the present drawing, the present invention is not limited to the NTSC system. It is needless to say that the present invention can be applied to the PAL and SECAM systems. The NTSC signal inputted from the analog broadcasting tuner 31 is separated into luminance and color or chrominance signals by the comb filter 321. In response to the chrominance signals, the color decoder 322 produces two color-difference signals called "(R-Y) and (B-Y)", for example. On the other hand, the luminance signal is caused to coincide in delay time with the two color-difference signals by the luminance signal delay circuit 323. Further, the synchronizing separator circuit 324 detects horizontal and vertical synchronizing signals of the NTSC signal. These color-difference signals, luminance signal and horizontal and vertical synchronizing signals are outputted to the input processor 33.

The analog clock generator 335 of the input processor 33 performs multiplication on the horizontal synchronizing signal to generate a clock signal of 13.5 MHz, for example. The clock signal is supplied to the three ADC 331 through 333 so that the color-difference and luminance signals inputted to these ADC 331 through 333 are converted into digital data. The color-difference and luminance signals converted to the digital data are supplied to the multiplexer 334. The input processor 33 is also supplied with a digital clock generated from the clock generator 6 of the decoder device. The digital clock is higher in frequency than the clock signal generated by the analog clock generator 335. The digital clock has a frequency of 54 MHz or 81 MHz, for example but is one synchronized with the pictorial data in the coded bit stream of the transport stream. Further, the digital clock is not synchronized with the clock signal generated from the analog clock generator 335. The digital clock is inputted to the multiplexer 334, enable signal generator 336 and address generator 337.

The enable signal generator 336 receives the clock signal generated from the analog clock generator 335 and thereby generates an enable signal with timing provided to allow the determination of digital data outputted from the three ADC 331 through 333 during one cycle of the digital clock. Described specifically, since 81 MHz is equal to six times 13.5 MHz but is in asynchronism in frequency, the leading edges of clocks at five to seven times in the digital clock are included in one cycle of 13.5 MHz. The enable signal indicates a data determination period of one cycle of 81 MHz during one cycle of 13.5 MHz. The multiplexer 334 captures the color-difference and luminance signals converted to the digital data with the digital clock, using the enable signal and performs asynchronous-synchronous clock conversion on the same. Further, the enable signal is supplied even to the address signal generator 337 from which an address signal corresponding to the position on the screen, of the digital data multiplexed by the multiplexer 334 is generated and outputted. As a result, the analog broadcast signal asynchronized with the transport stream transmitted in digital broadcasting can be processed with the digital clock. While the input processor 33 shown in FIG. 8 performs multiplexing with the digital clock, there is also known a method of multiplexing some or all of the luminance and color-difference signals in a state of an analog signal, converting it into digital form and thereafter performing asynchronous-synchronous clock conversion to timing of the digital clock.

Returning to the description of FIG. 7, the memory 8 selects storing pictorial data according to the selection as to whether an image to be displayed on the monitor 18 is based on the digital broadcast or analog broadcast. When it is based on the digital broadcast, it indicates pictorial data decoded by a video decoder 12. When it is based on the analog broadcast, it corresponds to pictorial data digitally-converted by the input processor 33. Theses are switched by the selector 40, after which it is inputted to the reformatter 14 where it is converted to an image or picture format suitable for the monitor 18. The resultant data is displayed or projected onto the monitor 18 through a second OSD circuit 15 and further the first DAC 16 and monitor driving circuit 17. When the pictorial data based on the analog broadcast is displayed, the reading of the pictorial data from the memory 8 by the reformatter 14 is performed according to the digital clock and carried out based on the horizontal and vertical synchronizing signals produced with the digital clock. However, a series of operations for capturing motion picture data by the input processor 33 and writing the data into and reading the data from the memory 8 by the reformatter 14 implement a function as a frame synchronizer.

With respect to audio signals, an audio signal used in the digital broadcast, which is obtained by decoding the input by the audio decoder 20, and an audio signal used in the analog broadcast, which is obtained from the analog broadcasting tuner 31, are both supplied to a speaker driving circuit 22 where either of them is selected according to the choice of the pictorial data and the selected one sounds through a speaker 23.

In the present embodiment described above, a receiver corresponding to the analog broadcast and the digital broadcast can be implemented because the digital broadcast and the analog broadcast can be projected onto the same monitor 18.

A fifth embodiment of the present invention will next be described with reference to FIG. 9. The description of certain common elements will be omitted in a manner similar to the description of the embodiments shown above up to now.

Figure 9:
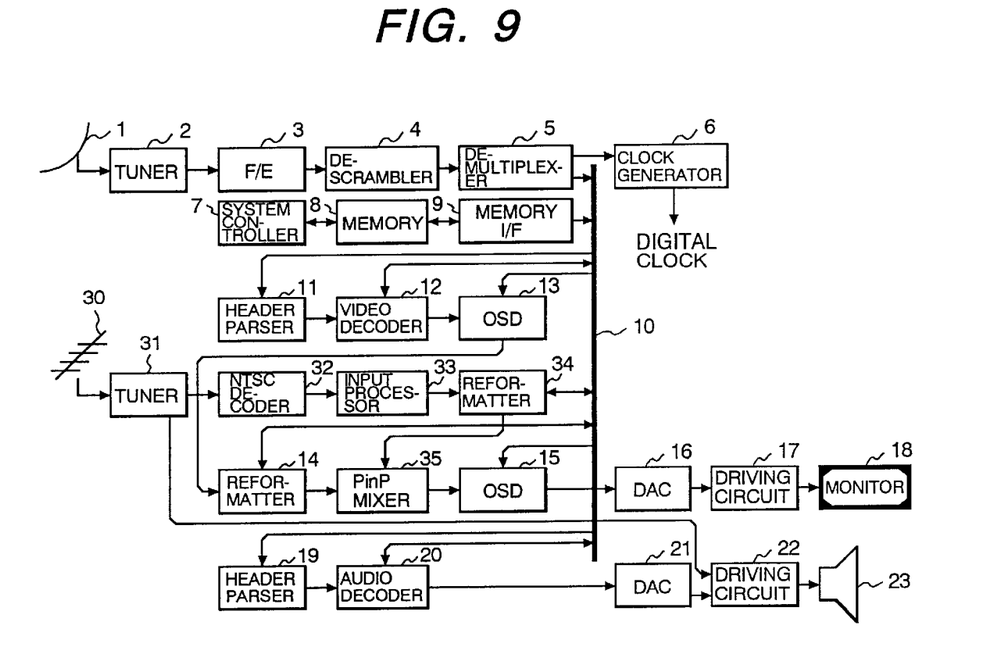
FIG. 9 depicts a fifth embodiment of the present invention and is a block diagram illustrating the present invention applied to a digital broadcasting receiver.

In FIG. 9, reference numeral 34 indicates a third reformatter and reference numeral 35 indicates a PinP mixer, respectively.

While an input processor 33 converts a video signal used in an analog broadcast into digital form as described above, the output thereof is supplied to the third reformatter 34. The third reformatter 34 is also identical in configuration to that described in FIG. 2. The third reformatter 34 converts the video signal used in the analog broadcast to an arbitrary picture format while using a memory 8, and outputs the converted output to the PinP mixer 35. The present embodiment is different from the fourth embodiment. The pictorial data obtained by converting the video signal used in the analog broadcast into digital form, and the pictorial data obtained by decoding the coded video stream used in the digital broadcast by the video decoder 12 are both stored in the memory 8. A first reformatter 14 converts the pictorial data used in the digital broadcast into an arbitrary picture format using the memory 8. Further, the third reformatter 34 has the frame synchronize function of converting the pictorial data used in the analog broadcast to horizontal and vertical synchronizing signals identical to the pictorial data used in the digital broadcast. These two pictorial data are combined into one by the PinP mixer 35. The combined pictorial data is projected onto a monitor 18 through a first DAC 16 and a monitor driving circuit 17.

In the present embodiment as described above, the received images or pictures used in both the analog and digital broadcasts can be displayed simultaneously using a picture-in-picture display format. Described specifically, a window is provided at an arbitrary position of a fullsized digital broadcast received image, and the analog broadcast received image reduced in size is put in the window. In contrast to this, the digital broadcast received image and the analog broadcast received image are reversed, and two windows substantially identical in size are provided within a TV screen, whereby the digital broadcast received image and the analog broadcast received image can be projected onto their windows.

Figure 16:
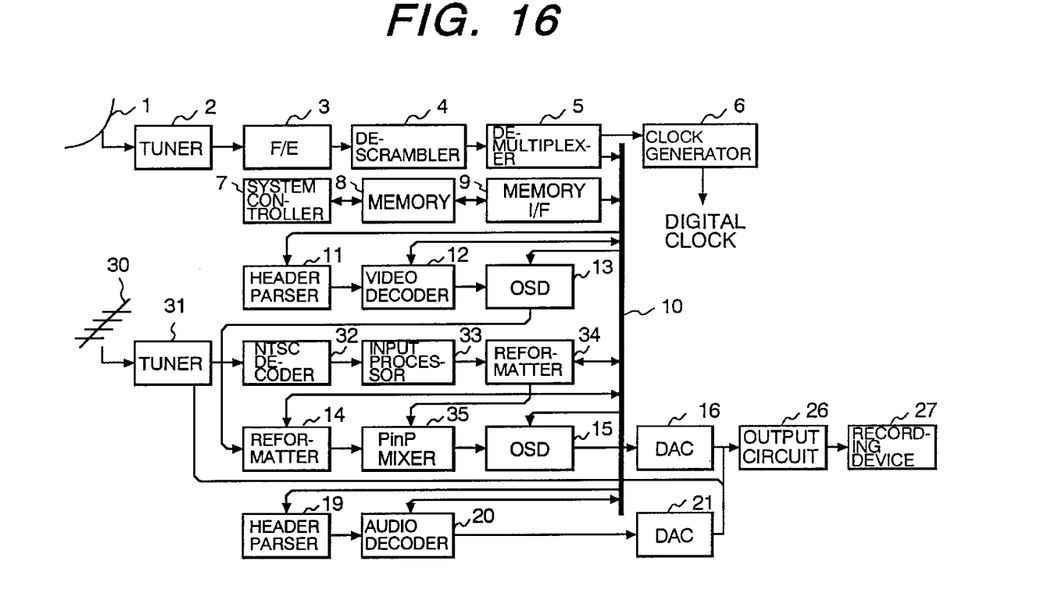
FIG. 16 depicts a modification of the fifth embodiment of the present invention and is a block diagram illustrating the present invention applied to a digital broadcasting receiver.
Figure 17:
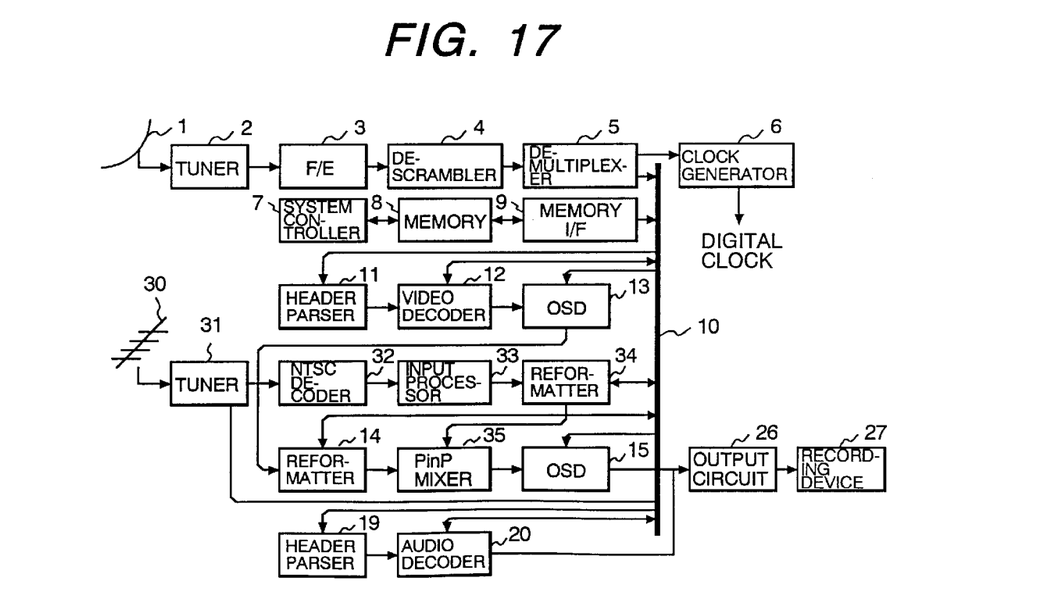
FIG. 17 shows another modification of the fifth embodiment of the present invention and is a block diagram illustrating the present invention applied to a digital broadcasting receiver.

As described in FIG. 4, a built-in VTR may be constructed in which the driving circuit 17 and monitor 18 shown in FIG. 9 are replaced with an output circuit 26 and a recording device 27. Alternatively, a built-in DVD may be constructed in which the DAC 16, driving circuit 17 and monitor 18 shown in FIG. 9 are replaced with an output circuit 26 and a recording device 27. These drawings are shown in FIGS. 16 and 17.

Figure 10:
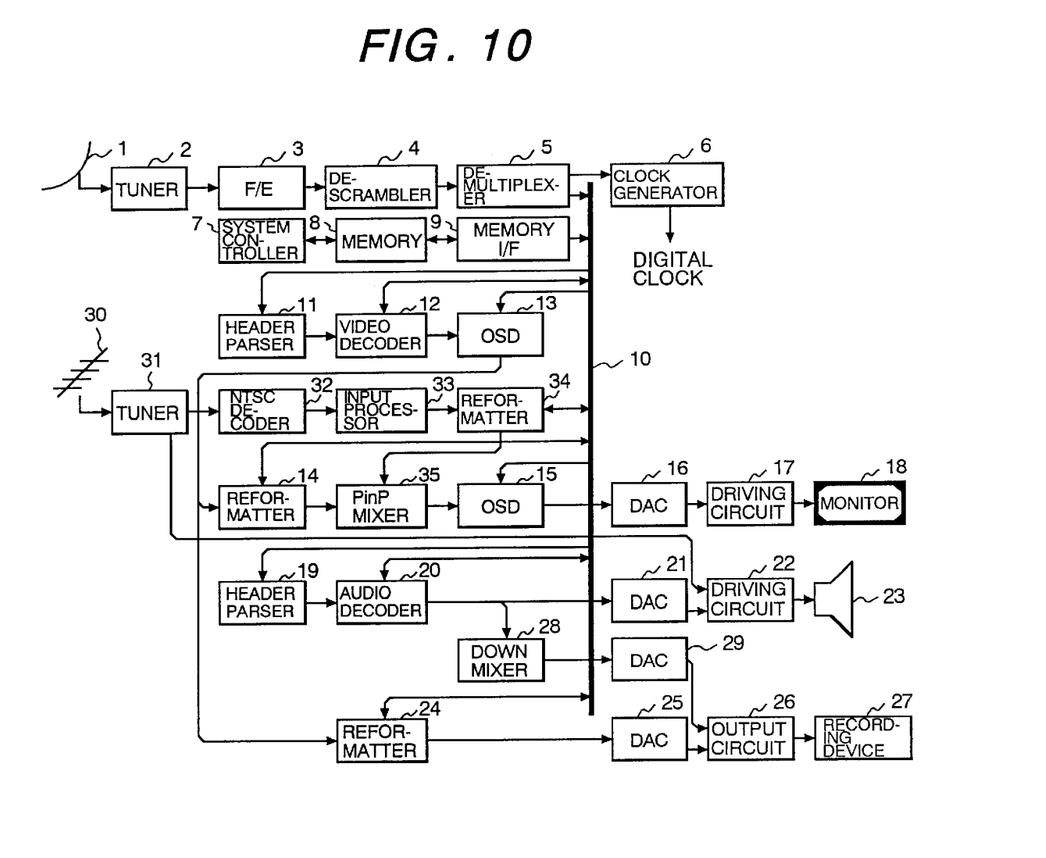
FIG. 10 illustrates a sixth embodiment of the present invention and is a block diagram showing the present invention applied to a digital broadcasting receiver.

FIG. 10 shows a sixth embodiment of the present invention. In the present embodiment, only the blocks employed in the embodiments described until now are utilized and no new ones are provided. If the present embodiment is compared with the fifth embodiment shown in FIG. 9, then the second reformatter 24, third DAC 25, recording output circuit 26, recording device 27, downmixer 28 and fourth DAC 29 described in the third embodiment of FIG. 6 are added thereto. These blocks are provided for recording of decoded motion picture data available in the digital broadcast. The second reformatter 24 reads decoded pictorial data used in the digital broadcast from a memory 8 independently of a first reformatter 14 and a third reformatter 34 and converts it to an image or picture format of SDTV for recording. As a result, in the present embodiment, the decoded motion picture data used in the digital broadcast can be recorded in the recording device 27 regardless of whether pictorial data displayed on the monitor 18 is based on the analog broadcast or the digital broadcast, or both are based on a picture-in-picture format.

Figure 11:
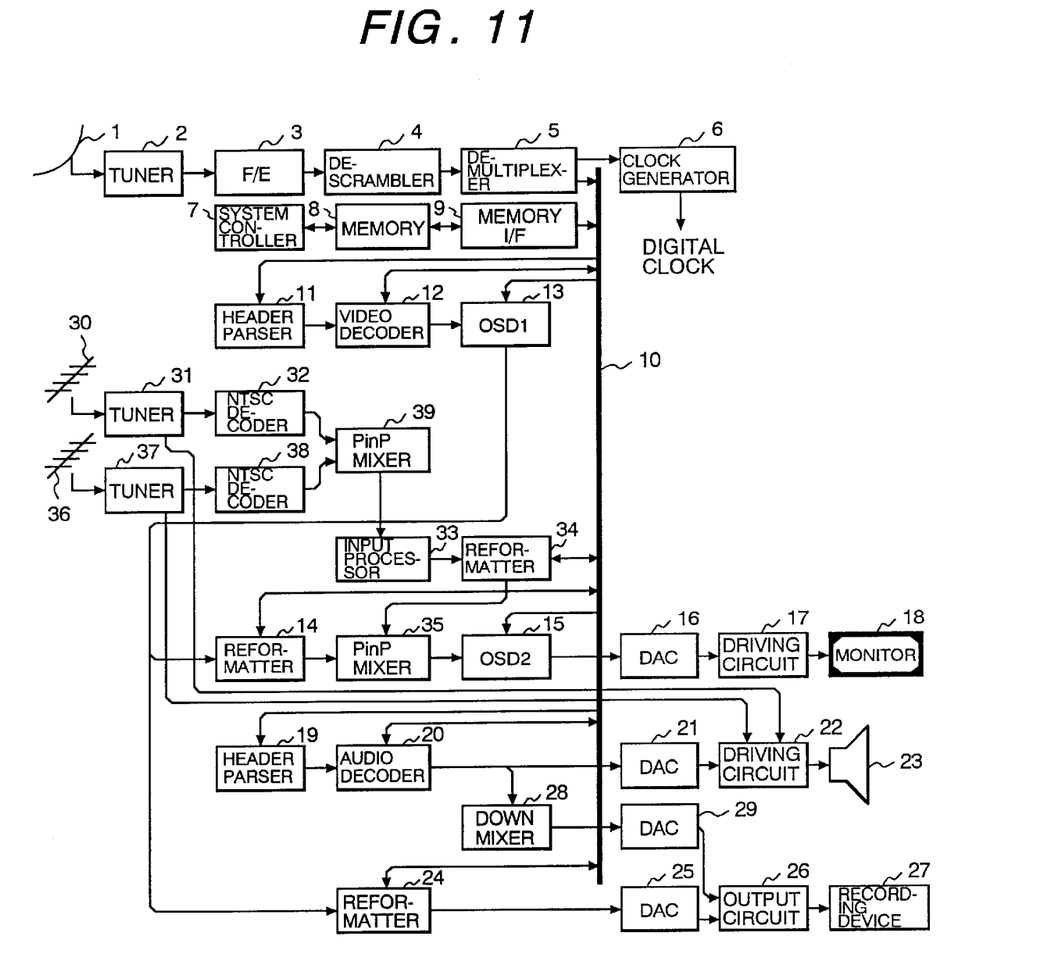
FIG. 11 shows a seventh embodiment of the present invention and is a block diagram illustrating the present invention applied to a digital broadcasting receiver.

A seventh embodiment of the present invention will next be described with reference to FIG. 11. If the present embodiment is compared with the sixth embodiment shown in FIG. 10, a second analog broadcasting antenna 36, a second analog broadcasting tuner 37, a second NTSC decoder 38 and a second PinP mixer 39 are added to the present embodiment.

In the present embodiment, the aforementioned analog broadcasting antenna 30, analog broadcasting tuner 31 and NTSC decoder 32 perform first analog broadcasting reception, and the second analog broadcasting antenna 36, second analog broadcasting tuner 37 and second NTSC decoder 38 perform second analog broadcasting reception simultaneously. The second PinP mixer has memory means thereinside and synchronizes the two received analog broadcasting pictorial data with each other to thereby obtain one synthesized analog broadcasting pictorial data in the picture-in-picture format. The input processor 33 inputs the combined analog broadcasting pictorial data therein and performs the same operation as that in the sixth embodiment subsequently to this input.

Thus, in the present embodiment, the picture-in-picture between the analog broadcasts can be also carried out as well as the combination of the analog broadcast and the digital broadcast. If a tuner and a decoder used for the digital broadcast are prepared as another set and they are replaced by the second analog broadcasting antenna 36, the second analog broadcasting tuner 37 and the second NTSC decoder 38, then the picture-in-picture between the digital broadcasts is also allowed. Even in these cases, the same display as the description of the picture-in-picture in FIG. 9 can be done.

While we have shown and described several embodiments in accordance with our invention, it should be understood that disclosed embodiments are susceptible of changes and modifications without departing from the scope of the invention. Therefor, we do not intended to be bound by the details shown and described herein but indented to cover all such changes and modifications as fall within the ambit of the appended claims.

We claim:

1. A decoder device, comprising:

a motion picture data decoder which decodes digital motion picture data to thereby obtain decoded motion picture data;

a memory which stores the decoded motion picture data therein;

a first on-screen data multiplexer which mixes the decoded motion picture data with first graphics data to thereby obtain first on-screen data-mixed motion picture data;

a picture format converter which converts the first on-screen data-mixed motion picture data into a picture format to thereby obtain format-converted motion picture data;

a second on-screen data multiplexer which mixes the format-converted motion picture data with second graphics data to thereby obtain second on-screen data-mixed motion picture data; and an output device which outputs the second on-screen data-mixed motion picture data therefrom.

2. A decoder device according to claim 1, wherein the first on-screen data-mixed motion picture data and the second on-screen data-mixed motion picture data are both outputted.

3. A receiver, comprising:

a motion picture data decoder which decodes digital motion picture data to thereby obtain decoded motion picture data;

a memory which stores the decoded motion picture data therein;

a first on-screen data multiplexer which mixes the decoded motion picture data with first graphics data to thereby obtain first on-screen data-mixed motion picture data;

a picture format converter which converts the first on-screen data-mixed motion picture data into a picture format to thereby obtain format-converted motion picture data;

a second on-screen data multiplexer which mixes the format-converted motion picture data with second graphics data to thereby obtain second on-screen data-mixed motion picture data; and a display which displays the second on-screen data-mixed motion picture data thereon.

* * * * *